US008154666B2

(12) United States Patent
Mody (10) Patent No.: US 8,154,666 B2
(45) Date of Patent: Apr. 10, 2012

(54) SPECTRUM SENSING FUNCTION FOR COGNITIVE RADIO APPLICATIONS

(75) Inventor: Apurva N Mody, Lowell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 552 days.

(21) Appl. No.: 12/342,485

(22) Filed: Dec. 23, 2008

(65) Prior Publication Data

US 2009/0102981 A1    Apr. 23, 2009

Related U.S. Application Data

(63) Continuation of application No. PCT/US2008/069893, filed on Jul. 11, 2008.

(60) Provisional application No. 60/959,254, filed on Jul. 12, 2007.

(51) Int. Cl.
*H04N 5/50* (2006.01)
*H04L 12/28* (2006.01)
*H04L 12/413* (2006.01)
*H04J 3/26* (2006.01)
*H04B 1/00* (2006.01)

(52) U.S. Cl. ........ 348/732; 370/390; 370/432; 370/445; 375/130; 375/132; 375/144

(58) Field of Classification Search ................... 370/252, 370/328, 29, 390; 375/316–352
See application file for complete search history.

(56) References Cited

U.S. PATENT DOCUMENTS

| 5,515,300 | A | 5/1996 | Pierce |
| 6,859,463 | B1 | 2/2005 | Mayor et al. |
| 2004/0213229 | A1* | 10/2004 | Chang et al. ................ 370/390 |
| 2007/0100922 | A1 | 5/2007 | Ashish |

FOREIGN PATENT DOCUMENTS
WO    2007/056081 A1    5/2007

OTHER PUBLICATIONS

Sadler, B.M. et al., "Estimation and Detection in NonGaussian Noise Using Higher Order Statistics", IEEE Trans. Signal Processing, Oct. 1994, pp. 2729-2741, vol. 42, No. 10.
Giannakis, G.B. et al., "A Unifying Maximum-Likelihood View of Cumulant and Polyspectral Measures for Non-Gaussian Signal Classification and Estimation", IEEE Trans. Inform. Theory, Mar. 1992, pp. 386-406, vol. 38, No. 2.
Shanmugan, K.S. et al. "Random Signals: Detection, Estimation and Data Analysis", John Wiley & Sons, New York, 1988. Mendel, J.M. "Tutorial on Higher-Order Statistics (Spectra) in Signal Processing and Systems Theory: Theoretical Results and Some Applications", IEEE Trans. Signal Processing, Mar. 1991, pp. 278-305, vol. 79, No. 3.
Nikias, C.L. et al., "Signal Processing with Higher-Order Spectra", IEEE J. Select. Areas Commun., Jul. 1993, pp. 10-37.
Pagnan, S. et al., "Experimental Evaluation of Cumulant-Based Classifiers on Noisy Images", IEEE, 1995, pp. 2419-2422.
PCT Search Report dated Oct. 8, 2008 of Patent Application No. PCT/US2008/069893 filed Jul. 11, 2008.

* cited by examiner

*Primary Examiner* — Huy Vu
*Assistant Examiner* — Brandon Renner
(74) *Attorney, Agent, or Firm* — Vern Maine & Associates; Daniel J. Long (57) ABSTRACT

A method and system are disclosed to detect a broad class of signals including Advanced Television Systems Committee (ATSC) digital television (DTV) and wireless microphone signals. This signal detection method performs in Gaussian noise, employing Higher Order Statistics (HOS). Signals are processed in time and frequency domains as well as by real and imaginary components. The spectrum sensing employed also supports Denial of Service (DoS) signal classification. The method can include parameters that may be tailored to adjust the probability of detection and false alarm.

43 Claims, 10 Drawing Sheets

SPECTRUM SENSING FUNCTION FOR COGNITIVE RADIO APPLICATIONS

RELATED APPLICATIONS

This application is a continuation of PCT Application No. PCT/US2008/069893—filed Jul. 11, 2008, which claims the benefit of U.S. Provisional Application No. 60/959,254, filed Jul. 12, 2007. In addition U.S. Provisional Application Ser. No. 60/814,367 filed Jun. 16, 2006, U.S. application Ser. No. 11/820,063 filed Jun. 18, 2007, are herein incorporated in their entirety by reference.

FIELD OF THE INVENTION

This invention relates to signal processing and more particularly to methods for use in detecting a broad class of signals in Gaussian noise using higher-order statistics.

BACKGROUND OF THE INVENTION

Most of the radio frequency spectrum is unevenly used. For example, cellular bands are overcrowded, but paging frequencies are underutilized. Increasing wireless communication demands are constrained by this inefficient use of the spectrum. This can extend to other than wireless communications. Any multifrequency system could benefit.

Efforts to increase efficiency have the potential to alleviate these problems. The practical objective is to fill empty bands and relieve crowded ones. Applications of this technology include secondary usage of the digital television (DTV) broadcasting bands for voice, video and data communications and cognitive radio.

For example, in May 2004, the United States Federal Communications Commission (FCC) announced in a Notice of Proposed Rule Making (NPRM) 04-113[3] exploring the use of unlicensed wireless operation in the television (TV) broadcasting bands. In response to this NPRM (and proceedings leading up to it), the IEEE 802 LAN/MAN Standards committee created the 802.22 working group (WG) on wireless regional area networks (WRAN) with a cognitive radio-based air interface for use by license-exempt devices on a non-interfering basis in VHF and UHF (54-862 MHz) bands. Hence, in case there are no incumbent signals (TV, wireless microphones etc.) using a particular channel or a band of spectrum, then WRAN devices may use these bands or channels for communications.

Spectrum sensing is a term applied to techniques used for finding unused temporal or spectral 'holes' by detecting, identifying and/or classifying the primary user signals. Spectrum sensing helps to achieve the goal of more efficiently using the radio spectrum.

There are many broad categories of spectrum sensing: transmitter detection using a single sensor, cooperative detection using multiple sensors, space time spectrum sensing using an antenna array, etc.

A function (hardware, software or firmware) that carries out the operation of spectrum sensing is termed as the Spectrum Sensing Function (S SF).

Various IEEE Standardization activities dealing with Cognitive Radio and Co-Existence of wireless systems are concerned with spectrum sensing. In particular, the IEEE 802.22/ IEEE 802.16h and P1900 Standards Committee (now IEEE SCC 41 Group).

Known work discusses signal detection in additive white Gaussian noise (AWGN) using higher-order statistics (HOS) as qualifiers, as is disclosed in B. M. Sadler, G. B. Giannakis, and K. S. Lii, "Estimation and Detection in NonGaussian Noise Using Higher Order Statistics," IEEE Trans. Signal Processing, vol. 42, no. 10, pp. 2729 {2741, October 1994; and G. B. Giannakis and M. Tsatsanis, "A Unifying Maximum-Likelihood View of Cumulant and Polyspectral Measures for Non-Gaussian Signal Classification and Estimation," IEEE Trans. Inform. Theory, vol. 38, no. 2, pp. 386-406, March 1992. It is also known that the higher-order cumulants for a Gaussian process are zero, as is disclosed in K. S. Shanmugan and A. M. Breipohl, "Random Signals: Detection, Estimation and Data Analysis," John Wiley & Sons, New York, 1988; J. M. Mendel, "Tutorial on Higher-Order Statistics (Spectra) in Signal Processing and Systems Theory: Theoretical Results and Some Applications," IEEE Trans. Signal Processing, vol. 79, no. 3, pp. 278-305, March 1991; and C. L. Nikias and J. M. Mendel, "Signal Processing with Higher-Order Spectra," IEEE J. Select. Areas Commun., pp. 10-37, July 1993, the contents all of which are incorporated herein by reference.

The drive toward miniaturization and low power consumption in communication systems creates a demand for simpler, more efficient, solutions. Current approaches can be complex and difficult to implement. A need, therefore, exists for methods and systems that can accommodate the constraints of today's communication systems.

Furthermore, detection of a broad class of signals heavily buried in noise is a major challenge. For example, IEEE 802.22 standard requires a spectrum sensing function to detect television signals accurately at a signal to noise ratio (SNR) of −21 decibels (dB). In situations such as this, the noise power is roughly 100 times greater than the signal power. Accurate detection of signals in such disadvantaged conditions is a major challenge. This application's method is capable of detecting signals accurately and efficiently at low SNRs.

The FCC also mandates the protection of approved Part 74 devices such as the wireless microphones in the VHF and UHF frequency bands. Because wireless microphones operate with lower bandwidth, lower power, and anywhere in a TV channel, they are difficult to detect and protect. To facilitate their detection, a beacon signal will be constantly transmitted from specialized devices that will accompany the wireless microphone base stations. These beacon signals consist of repeated pseudo noise (PN) sequences and have a bandwidth of approximately 78 kHz with the center frequency at approximately the same location as that of the Advanced Television Systems Committee-Digital Television (ATSC-DTV) pilot signal of the channel currently occupied by the wireless microphone. This technique is capable of detecting such beacon signals accurately and efficiently at low SNRs.

BRIEF SUMMARY OF THE INVENTION

Aspects of the invention address the above needs and provide at least the advantages below. Embodiment descriptions address steps of implementation of a Spectrum Sensing Function for signal detection in the presence of additive white Gaussian noise (AWGN) using higher-order statistics (HOS). This method is efficient and simple to implement. It may be used to detect a broad class of signal types such as Advanced Television Systems Committee (ATSC) digital television (DTV) signals, base-band, pass-band, single-carrier, multi-carrier, frequency-hopping, non-frequency-hopping, broad-band, narrow-band, broad-pulse, narrow-pulse, among others. Embodiments of the signal detection method perform well at low signal to noise ratio (SNR). Based on system requirements for tolerable probability of detection (PD) and probability of false alarms (PFA), it is possible to tailor the performance of the methods by altering a few parameters. Additionally, embodiments give the time frequency detection ratio (TFDR) which may be used to determine if the detected signal falls in Class Single-Carrier of Class Multi-Carrier. Included are descriptions of applications such as multiple signal identification and finding the basis functions for the received signal. Results with real-time, over the air collected, test waveforms are also given for applications of embodiments.

Embodiments include a method for implementation of a Spectrum Sensing Function wherein Higher Order Statistics (HOS) are applied to segments of received signals in time and frequency domains comprising the steps of moving to a particular portion of a frequency spectrum; applying a band pass filter; applying a low noise amplifier; collecting waveforms in the portion of a frequency spectrum; downconverting the collected waveforms; applying a low pass filter; converting to focus on a spectrum of interest; sampling to adjust a sampling rate; applying an analog to digital conversion; applying serial to parallel conversion to convert a stream of samples; applying a Fast Fourier Transform (FFT); detecting at least one signal using higher order statistics; classifying a segment as belonging to Class Signal or Class Noise; and identifying at least one signal.

For embodiments, the frequency spectrum may be a channel. Downconverting may be to base-band or to an intermediate frequency (IF) band. Converting direction may be up or down and sampling may be up or down. Applying serial to parallel conversion may convert the stream of samples to segments or vectors. In embodiments, each segment is processed individually OR all segments are concatenated into one large block and processed collectively.

In further embodiments, time and frequency domain components are processed separately. Pre-processing may be selected from the group consisting of: filtering, noise whitening, down-conversion, up-conversion, frequency shift, frequency translation, re-sampling, down-sampling, up-sampling, applying a Fast Fourier Transform (FFT), signal conditioning wherein the pre-processing and is applied to the collected waveform before computing higher order statistics (HOS). Real and imaginary components may be processed separately. In other embodiments, Higher Order Statistics (HOS) processing is selected from the group consisting of: singular higher order cumulants, power spectral density, bi-spectrum, tri-spectrum, and a poly-spectrum. Multiple parallel stages are used to perform steps to convert, adjust, second low pass filter, sample, and signal detection to perform Spectrum Sensing in multiple bands simultaneously.

In yet other embodiments, a method of signal identification comprises the steps of: moving to a particular portion of a frequency spectrum; applying a band pass filter; collecting waveforms present in the spectrum; downconverting the collected waveforms; applying an analog to digital conversion; first filtering down-converted signal through an image rejection first Low Pass (LP) filter, wherein an image of the down-converted signal is suppressed; upconverting the first filtered signal, wherein a characteristic frequency component of said signal would be shifted closer to 0 Hertz frequency; second filtering the upconverted signal; downsampling the second filtered signal; converting samples of the downsampled signal from serial to parallel; collecting the samples; storing the samples in a buffer; applying a Fast Fourier Transform (FFT); determining higher order moments and cumulants of real and imaginary portions of the stored samples; calculating signal probability; and classifying received signal.

In embodiments, a standardizing source for the received signal is selected from the group consisting of the Advanced Television Systems Committee (ATSC), Digital Television (DTV), National Television Systems Committee (NTSC), and Digital Video Broadcasting (DVB). In others, the received signal comprises a wireless microphone signal. In yet others, the received signal comprises a wireless microphone beaconing signal (e.g. IEEE 802.22.1), or a co-existing beaconing signal. For other embodiments the characteristic frequency component of the signal is the video or audio carrier of a television signal. A demodulating stage Fast Fourier Transform (FFT) may detect a wireless microphone signal. A Fast Fourier Transforms (FFT) stage may be used for data demodulation to implement a spectrum sensing function. Fast Fourier Transforms (FFTs) used for data demodulation and to implement a spectrum sensing function may have equal sizes. Or, Fast Fourier Transforms (FFT) stages used for data demodulation and to implement a spectrum sensing function may have un-equal sizes.

In embodiments, the collected waveform of the downconverting step is collected at Radio Frequency (RF) stage or at the Intermediate Frequency (IF) stage. In further embodiments, the first low pass filter of the first filtering step has a bandwidth of 8 MHz. The first filtered signal is upconverted by approximately 2.69 MHz. The second low pass filter of the second filtering step has a bandwidth equal to NFFT/ (($T_{sensing}$) Z). In other embodiments, downsampling the second filtered signal is by a factor of floor (Fs/(Second Filter Bandwidth)). The converting step is carried out using a first-in first-out (FIFO) buffer and a Fast Fourier Transform (FFT) of length NFFT. Other embodiments comprise adjusting a fine threshold parameter ($\gamma$); and reclassifying the received signal.

Still other embodiments comprise choosing a probability step parameter ($\delta$) equal to one-half the inverse of a number of moments and cumulants of order greater than two available for computation of real and imaginary parts of each segment of the received signal. Yet other embodiments comprise choosing all cumulants greater than two for computation of signal detection probabilities. Further embodiments comprise choosing a subset of cumulants for computation of signal detection probabilities.

For embodiments, the frequency spectrum is a channel and downconverting is to base-band or to an intermediate frequency (IF) band. In embodiments, Advanced Television Systems Committee (ATSC) digital television (DTV) signals are detected near ATSC-DTV pilot tones. Wireless microphone beaconing signals are detected in the vicinity of Advanced Television Systems Committee (ATSC) digital television (DTV) pilot tones. Digital Video Broadcasting (DVB) digital television (DTV) signals are detected in a vicinity of pilot tones.

In additional embodiments, multiple parallel stages are used to perform steps to convert, adjust, second low pass filter, sample, and signal detection to perform Spectrum Sensing in multiple bands simultaneously.

Yet another embodiment is a wireless system for Spectrum Sensing and signal identification wherein Higher Order Statistics (HOS) are applied to segments of received signals in time and frequency domains comprising signal detection and identification classification modules configured to perform the steps of moving to a particular portion of a frequency spectrum; applying a band pass filter; collecting waveforms present in the spectrum; downconverting the collected waveforms; applying an analog to digital conversion; first filtering down-converted signal through an image rejection first Low Pass (LP) filter, wherein an image of the downconverted signal is suppressed; upconverting the first filtered signal, wherein a video carrier would be shifted closer to 0 Hertz frequency; second filtering the upconverted signal; downsampling the second filtered signal; converting samples of the downsampled signal from serial to parallel; collecting the samples; storing the samples in a buffer; applying a Fast Fourier Transform (FFT); determining higher order moments and cumulants of real and imaginary portions of the stored samples; calculating signal probability; and classifying the received signal.

A further embodiment is a computer-readable medium having computer-readable signals stored thereon that define instructions that, as a result of being executed by a computer, instruct the computer to perform a method for signal identification wherein Higher Order Statistics (HOS) are applied to segments of received signals in time and frequency domains comprising the steps of receiving a signal; detecting at least one signal; and identifying at least one signal.

Another embodiment is a computer-readable medium having computer-readable signals stored thereon that define instructions that, as a result of being executed by a computer, instruct the computer to perform a method for signal identification wherein Higher Order Statistics (HOS) are applied to segments of received signals in time and frequency domains comprising the steps of receiving a signal; detecting at least one signal; and classifying at least one signal.

Yet another embodiment is a method for classifying a Denial of Service (DoS) signal comprising the steps of determining bit error rate degradation of a received signal; performing signal or noise detection on the received signal using higher order statistics (HOS); detecting time and frequency domain components of the received signal; identifying Gaussianity whereby the DoS signal is classified from results of the detecting step.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

I. Higher-Order Statistics as Non-Gaussian Qualifiers

There are a number of ways in which a useful, information bearing, signal can be detected from additive noise. Some of these methods are: 1) Energy detection, 2) Spectral correlation, 3) Checking for cyclo-stationarity of the received waveform, 4) Use of higher order statistics, etc. As an illustration, we use a higher order statistics based signal detection method here but any of the above techniques may be used.

It is known that the higher order cumulants for a Gaussian process are zero. Cumulants are defined as the multiplicative coefficients for each term of the Taylor series expansion of the logarithm of the characteristic function. The characteristic function of $\psi X(\omega)$ of a random variable X is defined as $$\psi X(\omega) = E\{\exp(j\omega X)\}, \quad (1)$$

where $j = \sqrt{-1}$. The natural logarithm of the characteristic function is defined as the cumulant generating function $$C_X(\omega) = \log\{\psi X(\omega)\}, \quad (2)$$

or in other words, $$\exp\{C_X(\omega)\} = \psi X(\omega). \quad (3)$$

Expanding both sides of the equation in a series form results in the following equality.

$$\exp\left\{c_1(j\omega) + c_2\frac{(j\omega)^2}{2!} + \ldots + c_n\frac{(j\omega)^n}{n!}\right\} = \qquad (4)$$

$$1 + j\omega E[X] + \frac{(j\omega)^2}{2!}E[X^2] + \ldots + \frac{(j\omega)^n}{n!}E[X^n],$$

where $c_1, c_2 \ldots c_n$ are the cumulants of the random process and $E[X]=m_1, E[X^2]=m_2, \ldots E[X^n]=m_n$ are the moments of the random process. When both the sides of the equations are expanded and the powers compared, we can obtain the relationship between the moments and the cumulants of the random process. Let $c_r = r^{th}$ order cumulant of x. Then the relationship between cumulants and the moments may be used to compute the higher order cumulants in a simple fashion as $$c_n = m_n - \sum_{k=1}^{n-1} \binom{n-1}{k-1} c_k m_{n-k} \tag{5}$$

where $$\binom{n-1}{k-1} = \frac{(n-1)!}{(k-1)! \cdot (n-k)!},$$

and $$y! = \text{Factorial}(y) = y \cdot (y-1) \cdot (y-2) \cdot (y-3) \ldots 2 \cdot 1$$

The Equation 5., when expanded can be written as follows:

$c_1 = m_1$ $c_2 = m_2 - m_1^2$ $c_3 = m_3 - 3m_1 m_2 + 2m_1^3$ $c_4 = m_4 - 4m_1 m_3 - 3m_2^2 + 12m_1^2 m_2 - 6m_1^4 \tag{6}$ Since we need to extract these statistics of the random process from the collected waveforms, after sampling the waveforms, we divide them into segments of length N and place them in vectors x. We then estimate the higher order moments for each of the segments using the following approximation $$\hat{m}_r = \frac{1}{N} \sum_{n=0}^{N-1} (x_n - \bar{x})^r \tag{7}$$

where $\hat{m}_r$ is the estimate of the $m^{th}$ order moment of the collected waveform samples, and $\bar{X}$ is the mean value for the N given samples of data defined as $$\bar{x} \approx \frac{1}{N} \sum_{n=0}^{N-1} x_n \tag{8}$$

Using the relationship between the moments and the cumulants of the random process (5 or 6), one can then estimate the cumulants for the received signal samples.

II. Method Progression

Since the cumulants are computed from the estimates of the moments for every segment of duration N, the longer the segment, the better are the statistics and the better the estimation. In practice, however, it is not possible to keep N to be extremely large and it is limited by the duty cycle of the signal itself, and the rate at which the signal changes. This means that even if the received waveform belongs to Class Noise, it is possible that the cumulants may be non-zero. Hence, instead of making a hard decision, we define a probability $P_{Signal}$ that a certain segment belongs to the Class Signal. We also define a threshold which, when exceeded, increases the probability that the received waveform falls into Class Signal, and when the threshold is not exceeded, it decreases the probability that the waveform falls into the Class Signal. Embodiments of the method follow:

A. Detection of a Broad Class of Signals

Many types of information-bearing signals show a Gaussian distribution in the time domain whereas in the frequency domain they are non-Gaussian. For example, the amplitude distribution of the multi-carrier signal samples, formed as a result of orthogonal frequency division multiplexing (OFDM) in the time-domain is Gaussian, but the distribution of its complex samples in the frequency domain is not. On the other hand, the amplitude distribution of a direct sequence spread spectrum (DSSS) signal in the time-domain is non-Gaussian. Hence, in order to be able to detect all these signal types, we apply the method in time as well as in the frequency domains.

Figure 1:
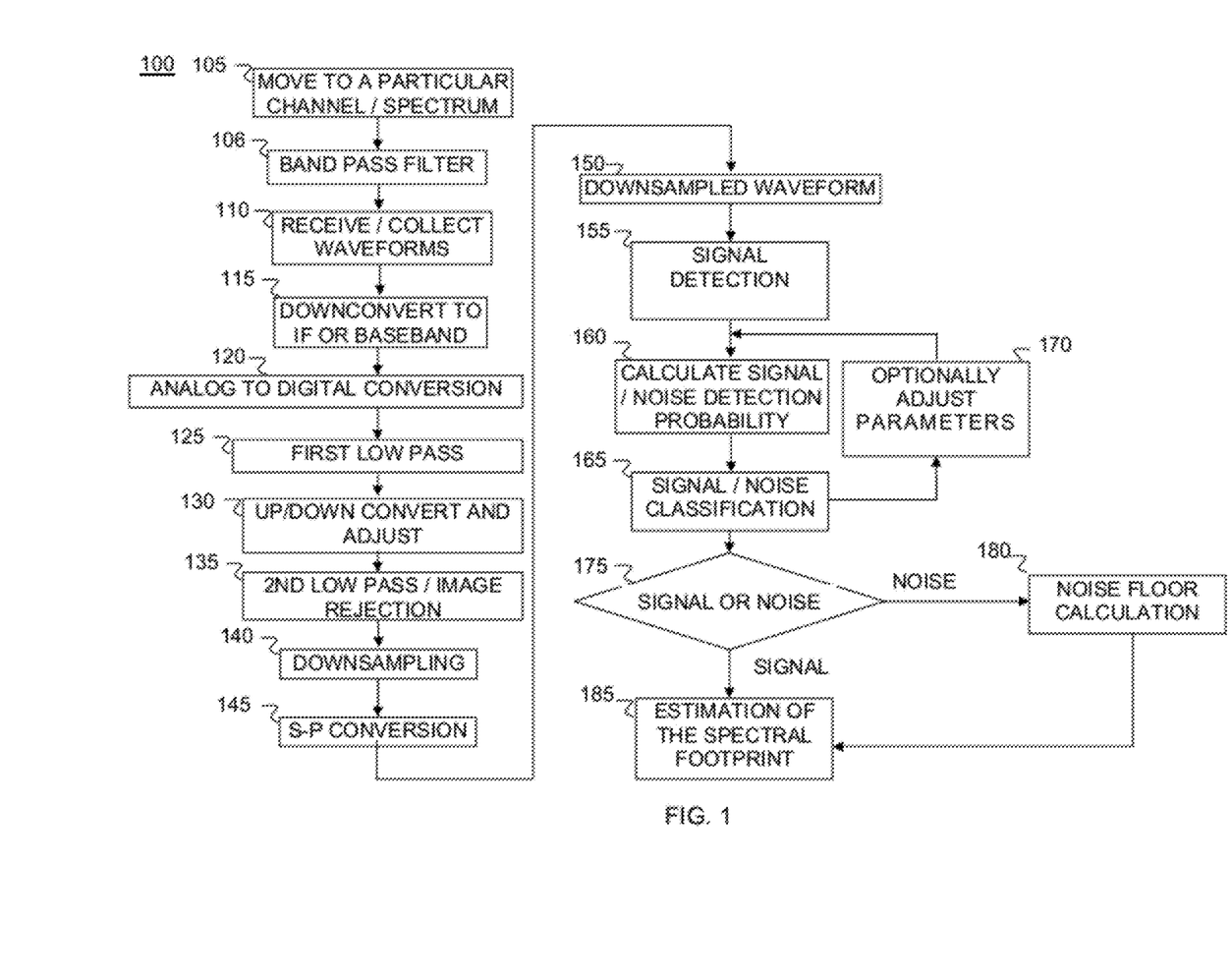
FIG. 1 depicts a simplified flow chart of a Spectrum Sensing Function (SSF) used for detecting a broad class of signals. In accordance with one embodiment, the flow chart represents the steps carried out to detect an ATSC DTV and wireless microphone as well as wireless microphone beacon signals.

FIG. 1 depicts a simplified flow chart 100 of a generalized Spectrum Sensing Function (SSF) used for detecting a broad class of signals. In accordance with one embodiment, the flow chart represents the steps carried out to detect an ATSC DTV and wireless microphone as well as wireless microphone beacon signals. Embodiments begin with the sensing platform 105, moving to a particular portion of the spectrum or a channel, followed by a band-pass filter 106 and receiving/collecting waveforms signals 110. The instruction to move and collect waveforms from a particular channel may come from a central or local authority such as a Spectrum Manager (SM). Next, downshift (downconvert) 115 the received waveform 110 of the signals or noise collected at the Radio Frequency (RF) to the Intermediate Frequency (IF) or the base band. Convert the received analog waveforms to digital discrete time waveforms using an Analog to Digital (A/D) converter 120. Pass the down-converted digitized signal through a Low Pass (LP) filter of total Bandwidth ($BW_1$) filter 125 used to limit the spectral content as well as reject any image. Upshift (upconvert) the signal 130 by approximately $f_V$ MHz. Pass the resultant signals through a second Low Pass (LP) 135 of bandwidth ($BW_2 = N_{FFT}/((T_{sensing}) Z)$) to reject any further unwanted parts of the spectrum followed by downsampling 140 of the signals by a factor of floor ($Fs/BW_2$). $T_{sensing}$=Sensing Duration, Z=1, 2, 3, determines the multiples of the sensing duration. For example, $T_{sensing}$=0.005 and Z=1 implies the total sensing duration of 5 mS. Similarly, $T_{sensing}$=0.005 and Z=2 implies the total sensing duration of 10 mS. Fs=sampling frequency of the signal before downsampling. and $N_{FFT}$=Size of the Fast Fourier Transform (FFT) used. Convert the input samples from serial to parallel 145. This may be carried out by using a FIFO buffer. The resultant downsampled waveform 150 is then passed on to the signal detection stage 155. The output of the signal detection stage is a probability measure 160 which signifies whether a particular segment of the downsampled waveform contains a valid signal or whether it is just noise. This signal or noise detection probability measure results in signal or noise classification 165 for each segment of downsampled waveform. Based on the detection performance, the parameters for the signal detection stage may be optionally adjusted 170. The collected segments of the waveform are then further processed to determine the noise floor 180 or the spectral footprint 185 based on whether the segment contains signal or noise 175.

Figure 2:
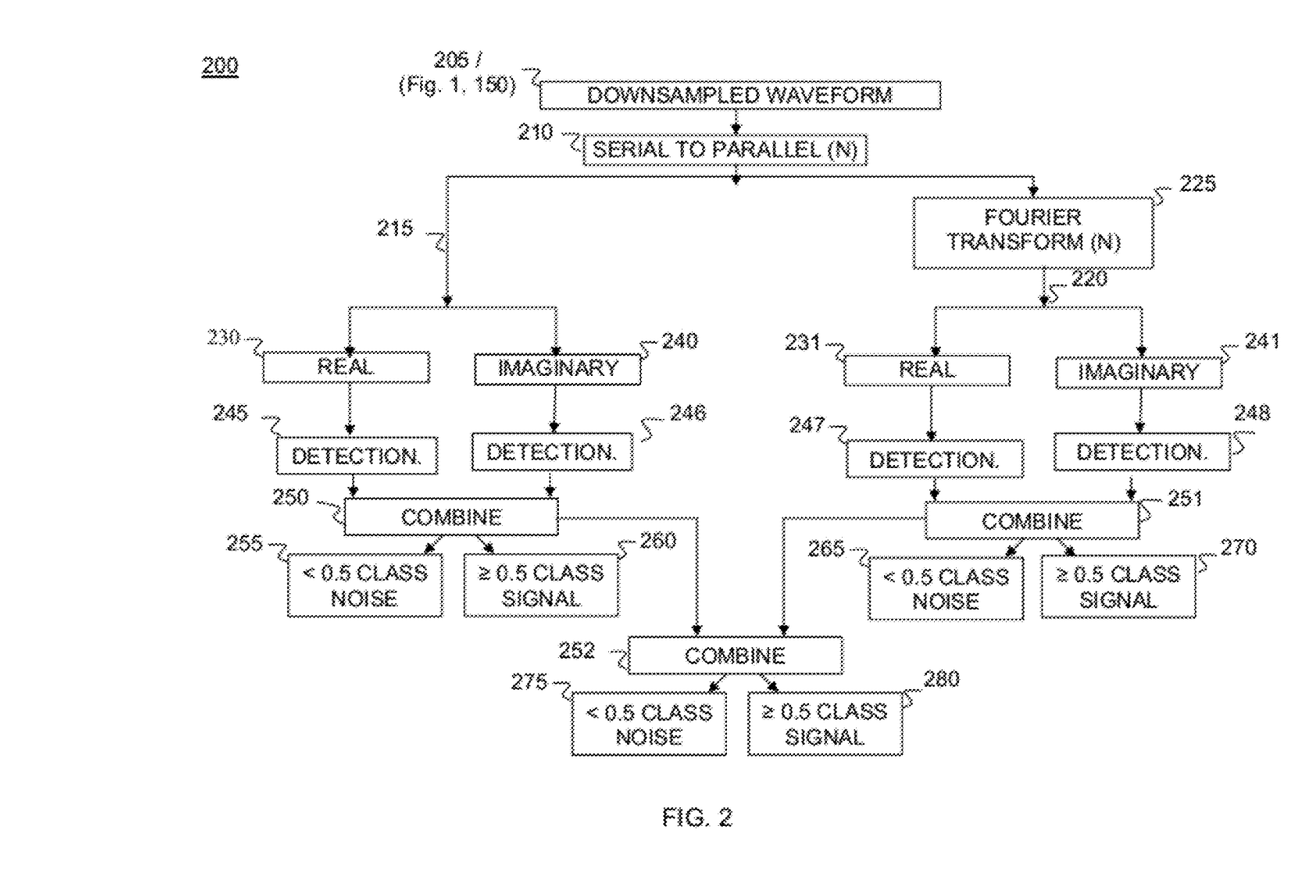
FIG. 2 depicts a simplified flow chart of the signal detector which takes sampled waveform as its inputs and makes a decision whether a particular segment of the received waveform contains a useful signal or belongs to noise. The figure depicts the time and frequency aspects of a method for detecting a broad class of signals in accordance with one embodiment.

FIG. 2 shows the signal detection stage. It depicts a simplified flow chart 200 of time and frequency aspects of a method for detecting a broad class of signals. The received waveform samples 205 are divided into segments of length N, using a serial to parallel (S/P) converter or a FIFO buffer 210 and are sent to two different branches. One detects the presence of the signal in the time domain 215 and the other in the frequency domain 220. Frequency domain detection is performed by first taking Fourier transform 225 of each of the segments as $$X_k = \frac{1}{\sqrt{N}} \sum_{n=0}^{N-1} x_n \exp\left\{-j\frac{2\pi nk}{N}\right\}, k = 0, 1, \ldots, N-1, \quad (9)$$

Time and frequency domain samples are further broken down into real (230 and 231 respectively) and imaginary (240 and 241 respectively) component vectors and each of these segments or vectors are subjected to the detection algorithm (245, 246, 247, 248). For the sake of simplicity, each of the segments of length N will be denoted by a variable X; where in the time domain X consists of the real or the imaginary components of the downsampled waveform and in the frequency domain, X consists of the real or the imaginary components of the Fourier co-efficients $X_k$s as shown in Equation (9). The outputs from the detection algorithm are the probability measures if a particular real or imaginary, time or frequency segments contain signal or noise. These measures may be combined (250, 251, 252, 255, 260, 265, 270, 275, 280) in various manner as will be described later to produce the net outcomes (130, 132, 150, 152, 155, 160) as to whether a particular segment of the downsampled waveform contains a useful signal or it is simply noise.

Figure 3:
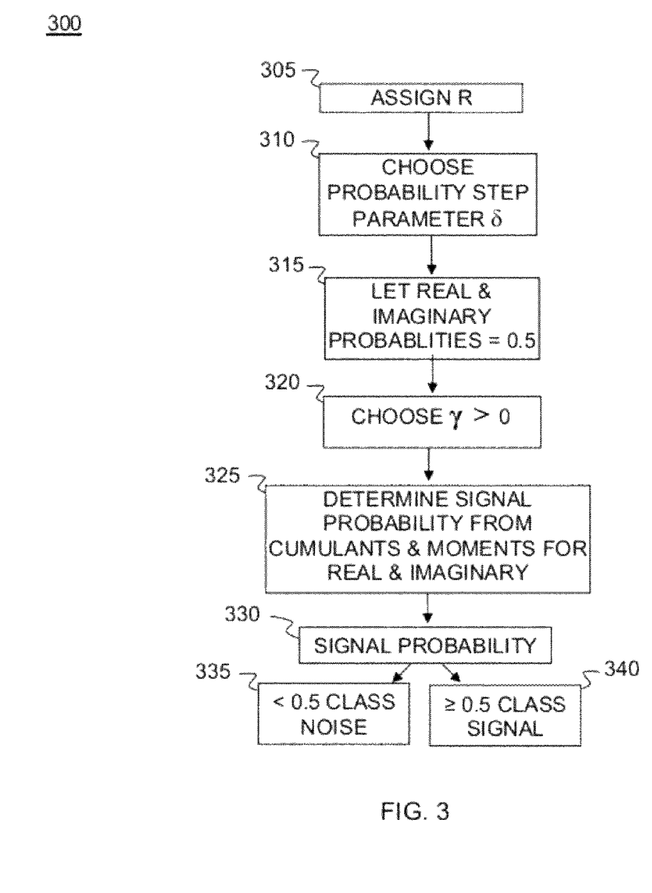
FIG. 3 depicts a simplified flow chart of a method for detecting a broad class of signals in accordance with one embodiment.

FIG. 3 depicts a simplified flow chart 300 of a method for detecting a broad class of signals. Let R 305 be the number of moments ($m_{r\_real}$, $m_{r\_imaginary}$) and cumulants ($C_{r\_real}$, $C_{r\_imaginary}$) of the order greater than two available for computation of the real and the imaginary parts of each of the segments (X) of data respectively.

Choose 310, a Probability Step Parameter $0<\delta<1$; For example let $\delta=0.5/R$.

Let $P_{Signal\_real}=P_{Signal\_imaginary}=0.5$; 315
Choose some $\gamma>0$; $\gamma_{typical}=1$ 320
Determine signal probability 325:
for r=2 to (R+2);

if $|c_{r\_real}|<\gamma|m_{2\_real}|^{r/2}, => P_{Signal\_real}=P_{Signal\_real}-\delta$ elseif $|c_{r\_real}|\geq\gamma|m_{2\_real}|^{r/2}, => P_{Signal\_real}=P_{Signal\_real}+\delta$ end, if $|c_{r\_imaginary}|$
$<\gamma|m_{2\_imaginary}|^{r/2}, => P_{Signal\_imaginary}=P_{Signal\_imaginary}-\delta$, elseif $|c_{r\_imaginary}|\geq$
$\gamma|m_{2\_imaginary}|^{r/2}, => P_{Signal\_imaginary}=P_{Signal\_imaginary}+\delta$ end, end (Results may be combined as in FIGS. 2, 250, 251, and 252) $P_{signal}=aP_{signal\_real}+bP_{Signal\_imaginary}$ where a and b weight parameters. As an example a=b=0.5

This produces a Signal Probability 330. If Signal Probability $P_{Signal}\geq0.5$, then X belongs to Class Signal 340; if $P_{Signal}<0.5$ then X belongs to Class Noise 335.

III. Applications of the Proposed Signal Detection Method

A. Detection of ATSC DTV and Wireless Microphone Beaconing Signals

Figure 4:
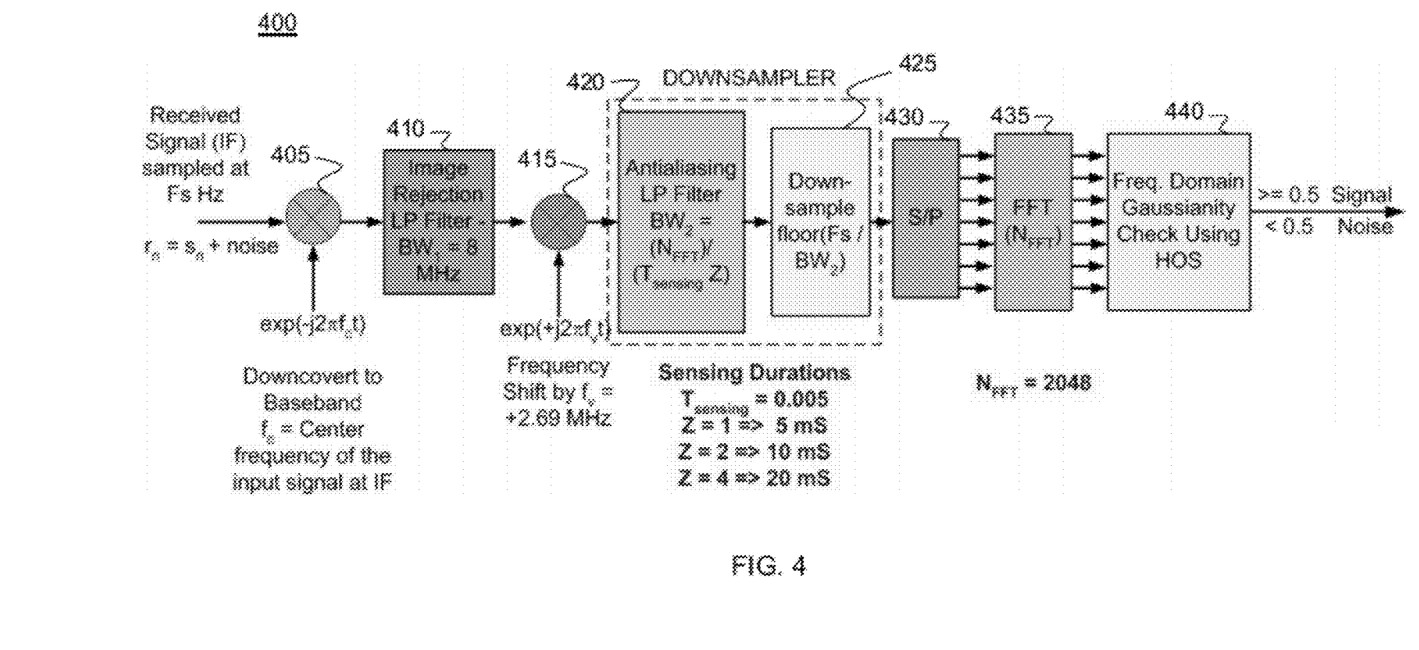
FIG. 4 is a block diagram for the signal or noise identification method for the detection of Advanced Television Systems Committee (ATSC) digital television (DTV) Signals in the presence of Gaussian noise in accordance with one embodiment. The proposed block diagram may also be used to detect wireless microphone and wireless microphone beacon signals.

FIG. 4 is a block diagram 400 for a system for the signal or noise identification method applied to the detection ATSC DTV signals in the presence of Gaussian noise. It follows the flow chart of the method of FIGS. 1, 2 and 3. Embodiments receive a signal Intermediate Frequency (IF) sampled at Fs Hz, where $r_n=s_n$+noise. The signal is downshifted (downconverted) 405 to Baseband $\exp(-j2\pi f_c t)$ where $f_c$=the center frequency of the input signal at IF. The down-converted signal is passed through an image rejection first Low Pass (LP) filter 410 of total Bandwidth (BW$_1$=8 MHz) for image rejection. The frequency is then upshifted 415 $\exp(+j2\pi f_v t)$ where $f_v$=+2.69 MHz, so that any DTV signal video carriers are shifted closer to 0 Hertz. The resultant signals pass through a second Antialiasing Low Pass (LP) Filter 420 of bandwidth $BW_2=N_{FFT}/((T_{sensing}) Z)$. $N_{FFT}$ is the size of the FFT used (2048 in this case) and $T_{sensing}$ is the Sensing Duration. Z determines the multiples of the sensing duration and may equal, for example, 1, 2, 4. If $T_{sensing}=0.005$ seconds and Z=1, the total sensing duration is 5 mS. Similarly, $T_{sensing}=0.005$ and Z=2 implies a total sensing duration of 10 mS. Data for multiple sensing durations are shown in graph FIGS. 6-9. This step is followed by downsampling 425 the signals by a factor of floor (Fs/BW$_2$). Fs is the sampling frequency of the original received signal and BW$_2$ is as previously defined. The input samples are next converted from serial to parallel 430. Embodiments employ a FIFO buffer and convert samples to the frequency domain using a process such as the Fast Fourier Transform (FFT) as shown in Equation (8) of length $N_{FFT}$ 435. $N_{FFT}$ may equal 2048. Collect samples at the output of the FFT 435. Then perform signal detection in the frequency domain using HOS 440. This is determined from the higher order moments and cumulants 440 of the real and imaginary portions of the stored samples using Equations (5), (6) and (7) as introduced in FIGS. 2 and 3.

Again, as introduced in FIGS. 2 and 3, apply the following steps to calculate signal probability 440.

Let R be the number of moments ($m_{r\_real}$, $m_{r\_imaginary}$) and cumulants ($c_{r\_real}$, $c_{r\_imaginary}$) of the order greater than two available for computation of the real and the imaginary parts of each of the segments (X) of data respectively, Choose a Probability Step Parameter $0<\delta<1$; For example let $\delta=0.5/R$.

Let $P_{Signal\_real}=P_{Signal\_imaginary}=0.5$;
Choose some $\gamma>0$; $\gamma_{typical}=1$
for r=2 to (R+2);

if $|c_{r\_real}|<\gamma|m_{2\_real}|^{r/2}, => P_{Signal\_real}=P_{Signal\_real}-\delta$ elseif $|c_{r\_real}|\geq$
$\gamma|m_{2\_real}|^{r/2}, => P_{Signal\_real}=P_{Signal\_real}+\delta$ end, if $|c_{r\_imaginary}|<$
$\gamma|m_{2\_imaginary}|^{r/2}, => P_{Signal\_imaginary}=P_{Signal\_imaginary}-\delta$, elseif $|c_{r\_imaginary}|\geq$
$\gamma|m_{2\_imaginary}|^{r/2}, => P_{Signal\_imaginary}=P_{Signal\_imaginary}+\delta$ end, end $P_{Signal}=aP_{Signal\_real}+bP_{Signal\_imaginary}$ where a and b weight parameters. As an example, a=b=0.5.

For signal classification 440, if $P_{Signal}\geq0.5$, then X belongs to Class Signal, and the ATSC DTV signal is detected. If $P_{Signal}<0.5$, then X belongs to Class Noise and the ATSC DTV signal is not detected. The parameter $\gamma$ is used to make fine adjustments of $P_{FA}$ if needed (FIG. 1, 170). As $\gamma$ increases, $P_{FA}$ decreases and vice-versa. In most cases, $\gamma$ is kept close to unity.

If the value is $\geq0.5$, the sample is classified as a signal. If the value is <0.5, then the sample is classified as noise.

These exact steps described above may be used to detect the wireless microphone as well as the wireless microphone beaconing signals.

B. Denial of Service (DoS) Classification

Figure 5:
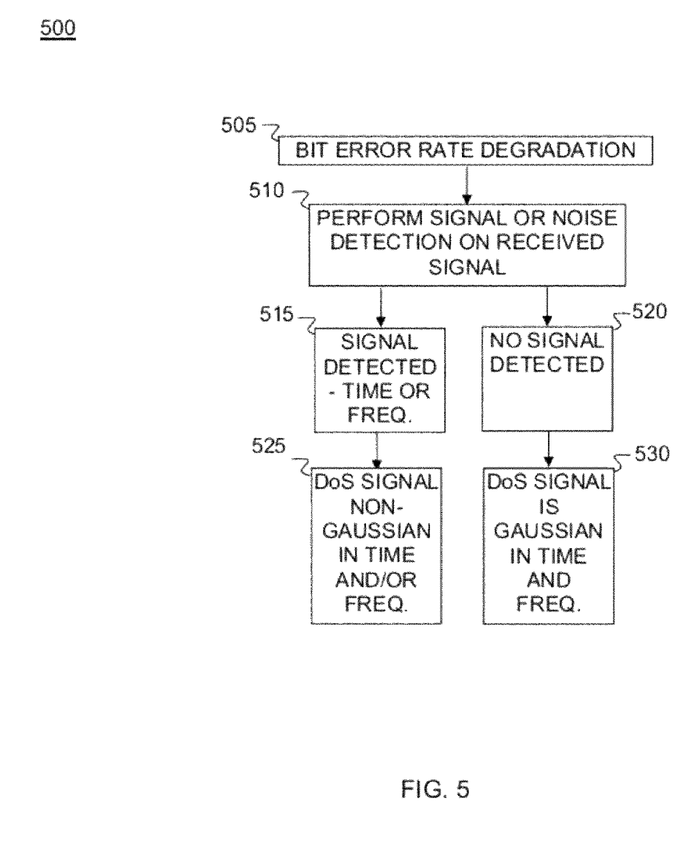
FIG. 5 depicts a simplified flow chart of a method for classifying Denial of Service (DoS) signals in accordance with one embodiment.

FIG. 5 depicts a simplified flow chart 500 of a method for classifying Denial of Service signals. In cases where performance metrics such as the bit error rate at the receiver show drastic degradation, it is possible that the received signal is being blocked 505. Perform signal or noise detection on the received signal 510 to separate signal from noise using higher order statistical method previously described (Blind Source Separation). If the signal is detected in the time or the frequency domains 515, then the DoS waveform is non-Gaussian in time and/or frequency domains 525. If the signal is not detected 520, then the DoS waveform is Gaussian in the time and frequency domains 530.

Figure 6:
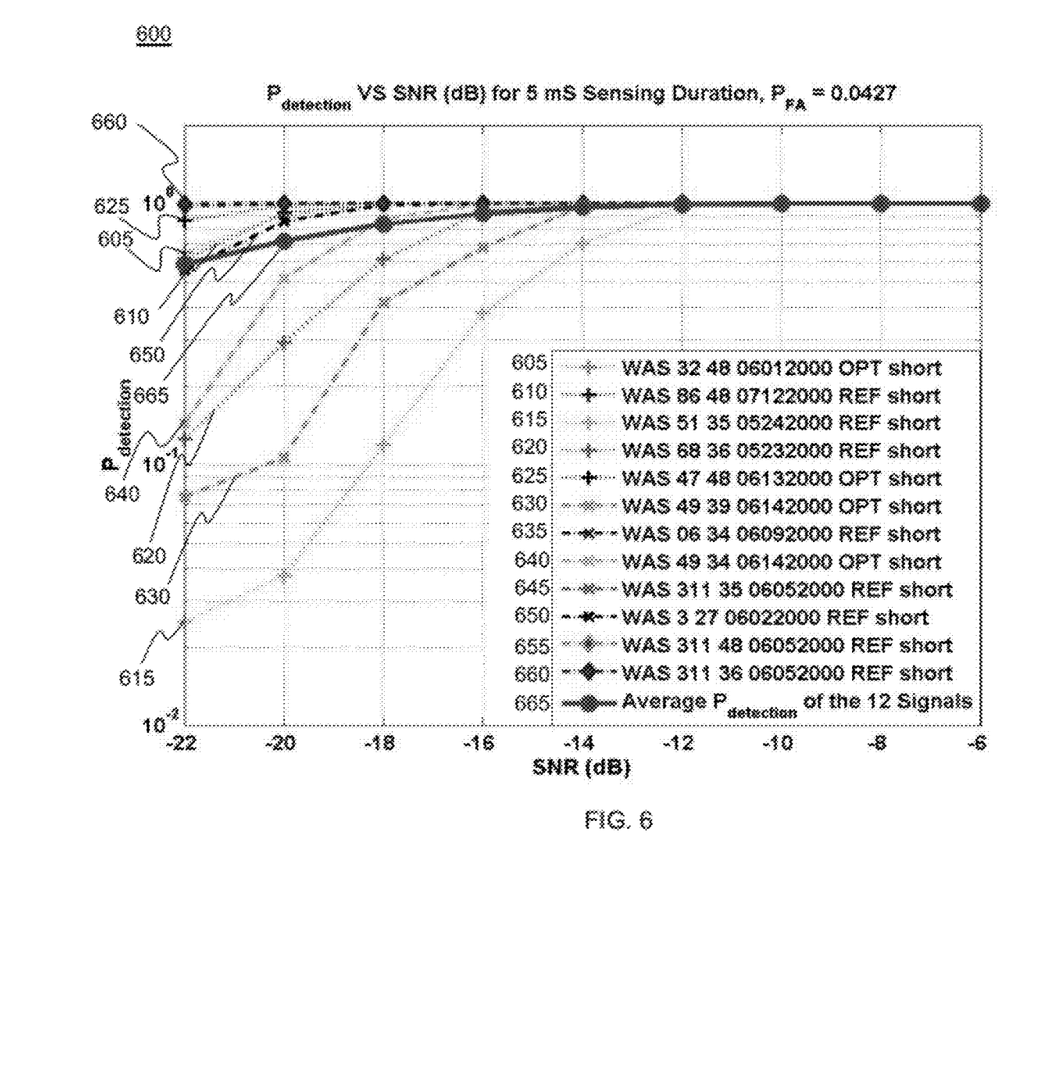
FIG. 6 shows the result of the detection method at various SNRs and 5 mS sensing window in accordance with one embodiment.

FIG. 6 is a graph 600 showing results of the detection method at various SNRs with a 5 mS sensing window and a probability of false alarm ($P_{FA}$) of 0.0427. It depicts the probability of detection, $P_{detection}$ between $10^0$ and $10^{-2}$ as a function of the signal to noise ratio (SNR) between −6 to −22 dB. Curves represent data for thirteen configurations as below. Configuration WAS 32 48 06012000 OPT short 605. Configuration WAS 86 48 07122000 REF short 610. Configuration WAS 51 35 05242000 REF short 615. Configuration WAS 68 36 05232000 REF short 620. Configuration WAS 47 48 06132000 OPT short 625. Configuration WAS 49 39 06142000 OPT short 630. Configuration WAS 06 34 06092000 REF short 635. Configuration WAS 49 34 06142000 OPT short 640. Configuration WAS 311 35 06052000 REF short 645. Configuration WAS 3 27 06022000 REF short 650. Configuration WAS 311 48 06052000 REF short 655. Configuration WAS 311 36 06052000 REF short 660. Lastly, the average $P_{detection}$ for the twelve above signals 665.

Figure 7:
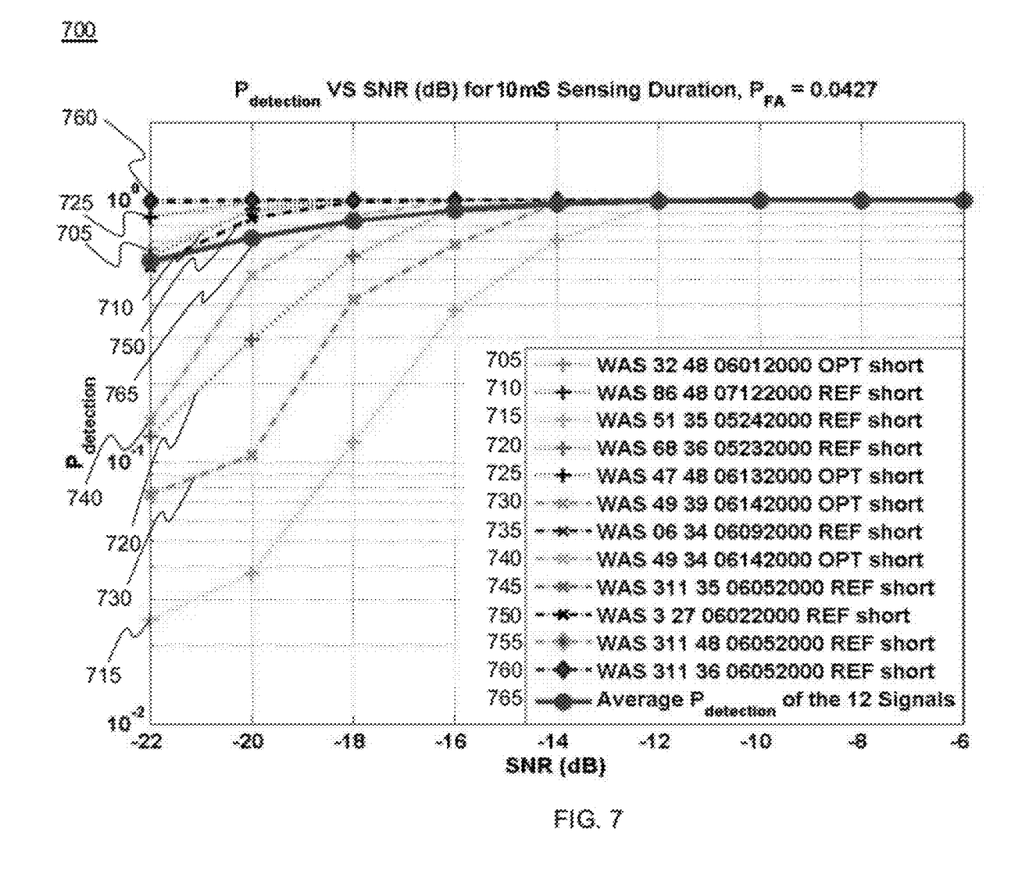
FIG. 7 shows the result of the detection method at various SNRs and 10 mS sensing window in accordance with one embodiment.

FIG. 7 is a graph 700 showing results of the detection method at various SNRs with a 10 mS sensing window and a probability of false alarm ($P_{FA}$) of 0.0427. It depicts the probability of detection, $P_{detection}$ between $10^0$ and $10^{-2}$ as a function of the signal to noise ratio (SNR) between −6 to −22 dB. Curves represent data for thirteen configurations as below. Configuration WAS 32 48 06012000 OPT short 705. Configuration WAS 86 48 07122000 REF short 710. Configuration WAS 51 35 05242000 REF short 715. Configuration WAS 68 36 05232000 REF short 720. Configuration WAS 47 48 06132000 OPT short 725. Configuration WAS 49 39 06142000 OPT short 730. Configuration WAS 06 34 06092000 REF short 735. Configuration WAS 49 34 06142000 OPT short 740. Configuration WAS 311 35 06052000 REF short 745. Configuration WAS 3 27 06022000 REF short 750. Configuration WAS 311 48 06052000 REF short 755. Configuration WAS 311 36 06052000 REF short 760. Lastly, the average $P_{detection}$ for the twelve above signals 765.

Figure 8:
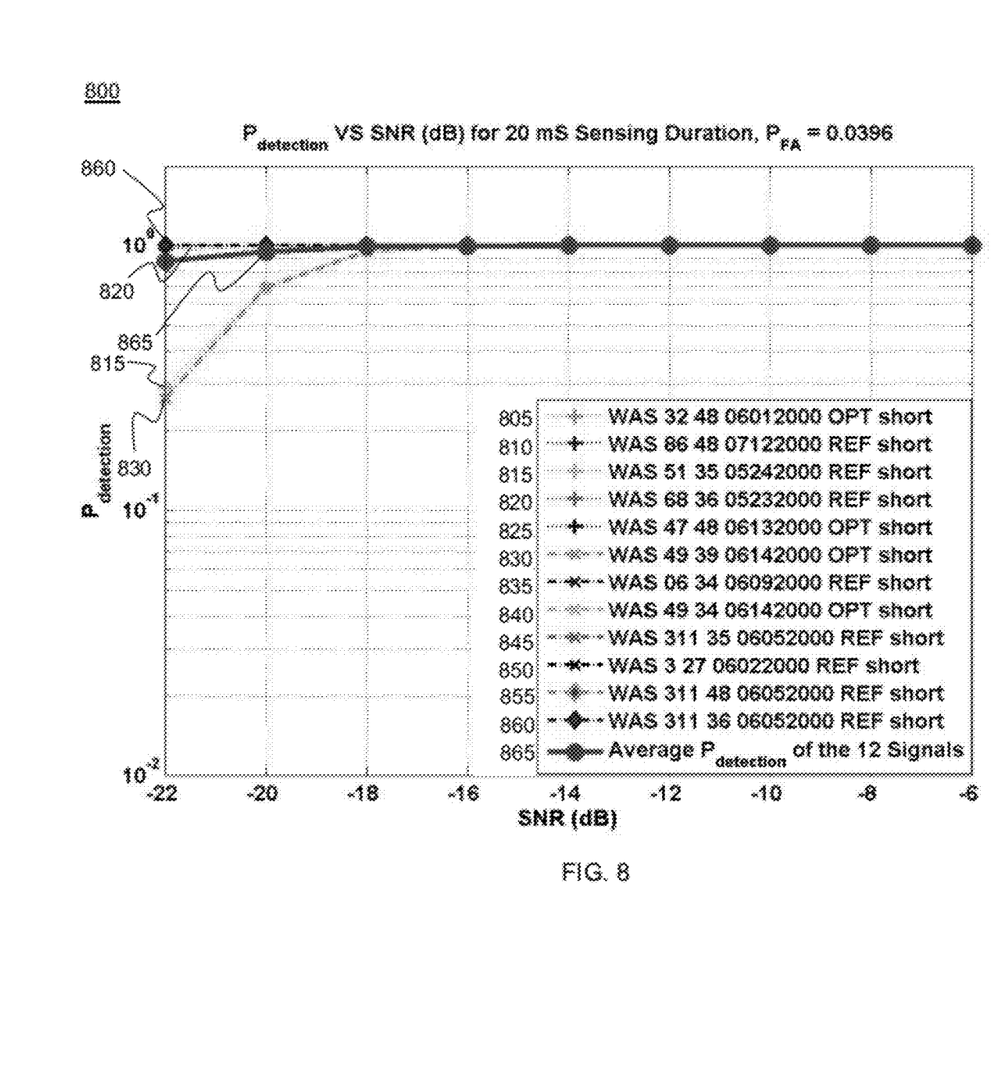
FIG. 8 shows the result of the detection method at various SNRs and 20 mS sensing window in accordance with one embodiment.

FIG. 8 is a graph 800 showing results of the detection method at various SNRs with a 20 mS sensing window and a probability of false alarm ($P_{FA}$) of 0.0396. It depicts the probability of detection, $P_{detection}$ between $10^0$ and $10^{-2}$ as a function of the signal to noise ratio (SNR) between −6 to −22 dB. Curves represent data for thirteen configurations as below. Configuration WAS 32 48 06012000 OPT short 805. Configuration WAS 86 48 07122000 REF short 810. Configuration WAS 51 35 05242000 REF short 815. Configuration WAS 68 36 05232000 REF short 820. Configuration WAS 47 48 06132000 OPT short 825. Configuration WAS 49 39 06142000 OPT short 830. Configuration WAS 06 34 06092000 REF short 835. Configuration WAS 49 34 06142000 OPT short 840. Configuration WAS 311 35 06052000 REF short 845. Configuration WAS 3 27 06022000 REF short 850. Configuration WAS 311 48 06052000 REF short 855. Configuration WAS 311 36 06052000 REF short 860. Lastly, the average $P_{detection}$ for the twelve above signals 865.

Figure 9:
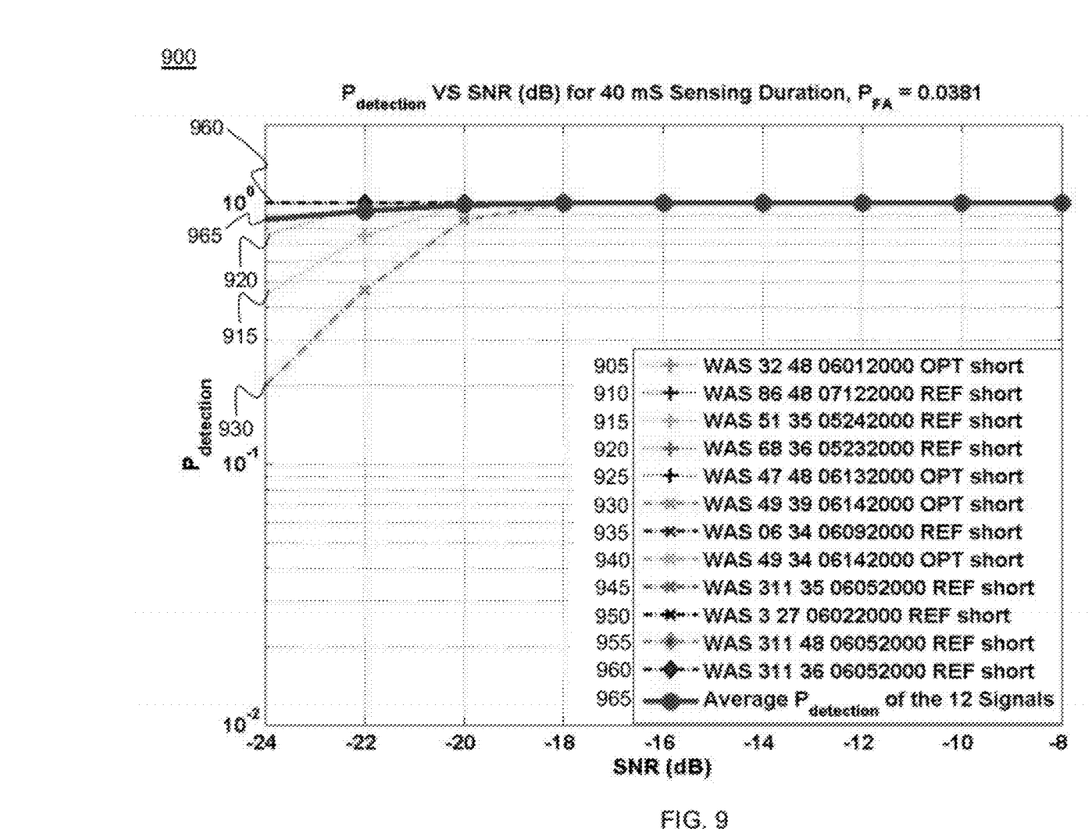
FIG. 9 shows the result of the detection method at various SNRs and 40 mS sensing window in accordance with one embodiment.

FIG. 9 is a graph 900 showing results of the detection method at various SNRs with a 40 mS sensing window and a probability of false alarm ($P_{FA}$) of 0.0381. It depicts the probability of detection, $P_{detection}$ between $10^0$ and $10^{-2}$ as a function of the signal to noise ratio (SNR) between −8 to −24 dB. Curves represent data for thirteen configurations as below. Configuration WAS 32 48 06012000 OPT short 905. Configuration WAS 86 48 07122000 REF short 910. Configuration WAS 51 35 05242000 REF short 915. Configuration WAS 68 36 05232000 REF short 920. Configuration WAS 47 48 06132000 OPT short 925. Configuration WAS 49 39 06142000 OPT short 930. Configuration WAS 06 34 06092000 REF short 935. Configuration WAS 49 34 06142000 OPT short 940. Configuration WAS 311 35 06052000 REF short 945. Configuration WAS 3 27 06022000 REF short 950. Configuration WAS 311 48 06052000 REF short 955. Configuration WAS 311 36 06052000 REF short 960. Lastly, the average $P_{detection}$ for the twelve above signals 965.

Figure 10:
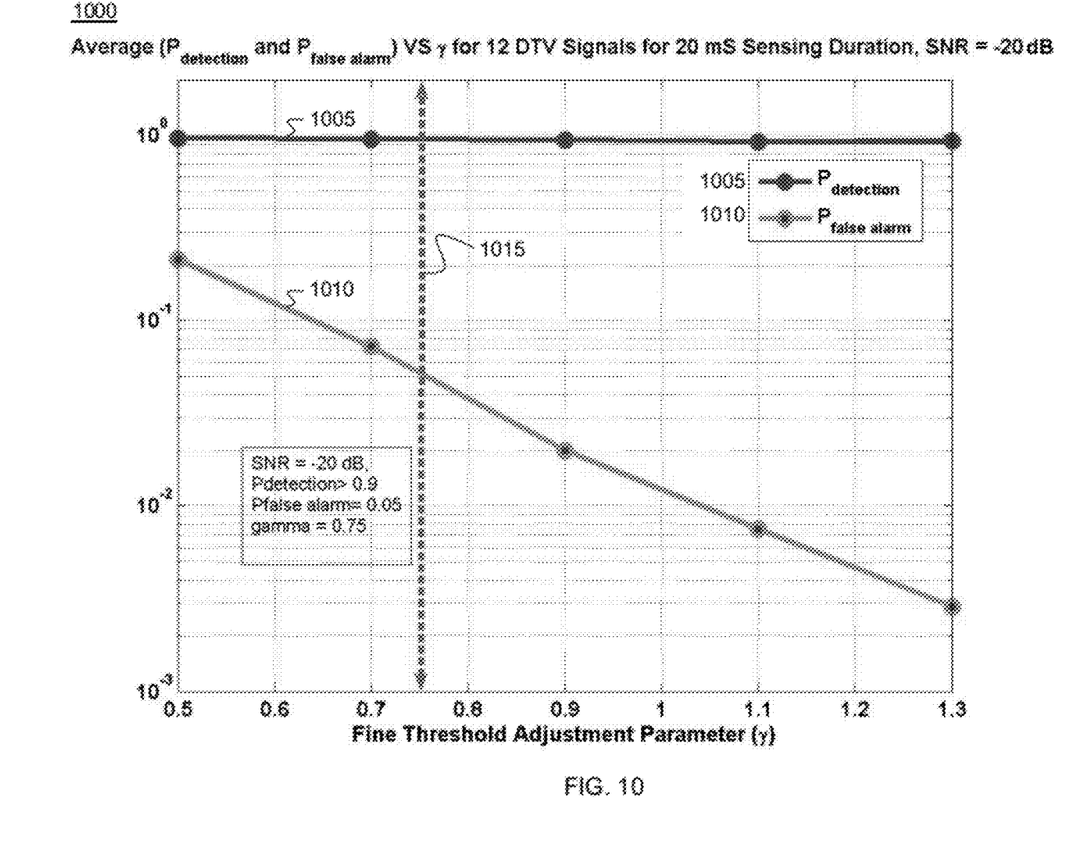
FIG. 10 shows the result of changing the fine threshold parameter ($\gamma$) in accordance with one embodiment.

FIG. 10 is a graph 1000 of the result of changing the fine threshold parameter (γ) on Probability of detection $P_{detection}$ 1005 and Probability of false alarm $P_{false\ alarm}$ 1010 for SNR of −20 dB and a sensing window of 20 mS for twelve DTV signals. Vertical dashed line 1015 represents γ=0.75, SNR=−20 dB, with $P_{detection}$>0.9, and $P_{false\ alarm}$=0.05.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for implementation of a Spectrum Sensing Function wherein Higher Order Statistics (HOS) are applied to segments of received waveforms in time and frequency domains comprising the steps of:

selecting a particular portion of a frequency spectrum;

applying a first band pass filter which is configured to exclude regions of the frequency spectrum that are outside of the selected portion;

applying a low noise amplifier;

collecting waveforms from said portion of said frequency spectrum;

downconverting said collected waveforms;

applying an analog to digital conversion to said waveforms at a first sampling rate;

applying a second filter to said waveforms;

up or down converting said waveforms so as to shift a characteristic frequency component of said waveforms to a specified detection frequency;

applying a third filter which is configured to pass only frequencies near the specified detection frequency;

resampling said waveforms so as to adjust the sampling rate;

applying serial to parallel conversion to convert the digitized waveforms to a stream of time domain segments, each time domain segment including a plurality of time domain samples;

applying a Fast Fourier Transform (FFT) to each time domain segment so as to obtain a corresponding frequency domain segment, each of the frequency domain segments including a plurality of frequency domain samples;

processing both the time domain segments and the frequency domain segments using higher order statistics;

classifying each segment as belonging to Class Signal or Class Noise; and for at least one segment that is classified as Class Signal, identifying at least one signal within said segment.

2. The method of claim 1, wherein said particular portion of said frequency spectrum is a channel.

3. The method of claim 1, wherein said downconverting is to baseband.

4. The method of claim 1, wherein said downconverting is to an intermediate frequency (IF) band.

5. The method of claim 1 wherein said up or down converting is upconverting.

6. The method of claim 1 wherein said up or down converting is downconverting.

7. The method of claim 1 wherein said resampling adjusts the sampling rate to a higher sampling rate.

8. The method of claim 1 wherein said resampling adjusts the sampling rate to a lower sampling rate.

9. The method in claim 1 wherein each said segment is processed individually.

10. The method in claim 1 wherein a plurality of said segments are concatenated into one large block and processed collectively.

11. The method of claim 1 wherein the time domain samples and the corresponding frequency domain samples are vectors having real and imaginary components.

12. The method of claim 1, wherein time domain segments and the corresponding frequency domain segments are processed separately.

13. The method of claim 1, comprising pre-processing selected from the group consisting of: filtering, noise whitening, down-conversion, up-conversion, frequency shift, frequency translation, re-sampling, down-sampling, up-sampling, applying a Fast Fourier Transform (FFT), signal conditioning wherein said pre-processing is applied to said collected waveform before computing higher order statistics (HOS).

14. The method of claim 11, wherein the real and imaginary components are processed separately.

15. The method of claim 1, wherein Higher Order Statistics (HOS) processing is selected from the group consisting of: singular higher order cumulants, power spectral density, bi-spectrum, tri-spectrum, and a poly-spectrum.

16. The method of claim 1, wherein multiple parallel stages are used to perform steps to up or down convert, adjust, apply a third filter, resample, apply serial to parallel conversion, apply FFT, and process segments using high order statistics so as to perform Spectrum Sensing of multiple characteristic frequency components of said waveforms simultaneously.

17. A method for signal identification comprising the steps of:

selecting a particular portion of a frequency spectrum;

applying a band pass filter which is configured to exclude regions of the frequency spectrum that are outside of the selected portion;

applying a low-noise amplifier;

collecting waveforms present in said particular portion of said spectrum;

downconverting said collected waveforms;

applying an analog to digital conversion to said waveforms at a first sampling rate;

first filtering said down-converted waveforms using an image rejection filter, wherein an image of said down-converted waveforms is suppressed;

up or down converting said first filtered waveforms, wherein a characteristic frequency component of said waveforms is shifted closer to 0 Hertz frequency;

second filtering said up or down converted waveforms;

downsampling said second filtered waveforms to reduce its sampling rate;

converting said downsampled waveforms from serial to parallel by dividing said downsampled waveforms into a plurality of time domain segments, each of said time domain segment including a plurality of time domain samples, each of said time domain samples having a real part and an imaginary part;

collecting said segments;

storing said segments in a buffer;

applying a Fast Fourier Transform (FFT) to each of said segments so as to obtain a corresponding frequency domain segment, each of the frequency domain segments including a plurality of frequency domain samples;

determining higher order moments and cumulants of real and imaginary portions of said frequency domain segments;

for each frequency domain segment, calculating a signal probability; and if the signal probability indicates that a signal has been received, classifying the received signal as Class signal.

18. The method of claim 17 wherein a standardizing source for said received signal is selected from the group consisting of Advanced Television Systems Committee (ATSC), Digital Television (DTV), National Television Systems Committee (NTSC), and Digital Video Broadcasting (DVB).

19. The method of claim 17 wherein said received signal comprises a wireless microphone signal.

20. The method of claim 17 wherein said received signal comprises a wireless microphone beaconing signal.

21. The method of claim 17 wherein said received signal comprises a co-existing beaconing signal.

22. The method of claim 17 wherein said characteristic frequency component of said waveforms is the video carrier of a television signal.

23. The method of claim 17 wherein said characteristic frequency component of said waveforms is the audio carrier of a television signal.

24. The method of claim 17, wherein a demodulating stage Fast Fourier Transform (FFT) detects a wireless microphone signal.

25. The method of claim 17 wherein said Fast Fourier Transform (FFT) is applied by a Fast Fourier Transform stage which is used for data demodulation and is also used to implement a spectrum sensing function.

26. The method of claim 17 wherein said Fast Fourier Transforms (FFTs) have equal sizes.

27. The method of claim 17 wherein said Fast Fourier Transforms (FFTs) have un-equal sizes.

28. The method of claim 17 wherein said collected waveforms of said downconverting step are collected at a Radio Frequency (RF) stage.

29. The method of claim 17 wherein said collected waveforms of said downconverting step are collected at an Intermediate Frequency (IF) stage.

30. The method of claim 17 wherein said first filter of said first filtering step has a bandwidth of 8 MHz.

31. The method of claim 17 wherein said first filtered waveforms are upconverted by approximately 2.69 MHz.

32. The method of claim 17 wherein said second filtering of said up or down converted waveforms is applied by a low pass filter having a bandwidth equal to $N_{FFT}/((T_{sensing})Z)$.

33. The method of claim 17 wherein said downsampling said second filtered waveforms is by a factor of floor (Fs/(Second Filter Bandwidth)).

34. The method of claim 17 wherein said converting step is carried out using a first-in first-out (FIFO) buffer and a Fast Fourier Transform (FFT) of length $N_{FFT}$.

35. The method of claim 17 further comprising:
adjusting a fine threshold parameter ($\gamma$); and
reclassifying said received signal.

36. The method of claim 17, wherein said particular portion of said frequency spectrum is a channel.

37. The method of claim 17 wherein said downconverting is to baseband.

38. The method of claim 17 wherein said downconverting is to an intermediate frequency (IF) band.

39. The method of claim 17 wherein Advanced Television Systems Committee (ATSC) digital television (DTV) signals are detected near ATSC-DTV pilot tones.

40. The method of claim 17 wherein a wireless microphone beaconing signal is detected in a vicinity of Advanced Television Systems Committee (ATSC) digital television (DTV) pilot tones.

41. The method of claim 17 wherein Digital Video Broadcasting (DVB) digital television (DTV) signals are detected in a vicinity of pilot tones.

42. The method of claim 17, wherein multiple parallel stages are used to perform the steps of up or down converting, second filtering, downsampling, converting from serial to parallel, applying an FFT, determining higher order moments and cumulants, calculating, and classifying so as to perform spectrum sensing simultaneously at a plurality of characteristic frequency components of said waveforms.

43. A system for Spectrum Sensing and signal identification of wireless waveforms wherein Higher Order Statistics (HOS) are applied to segments of received waveforms in time and frequency domains, the system comprising:
a band pass filter that is configured to select waveforms from a particular portion of a frequency spectrum and exclude from the selected waveforms regions of the frequency spectrum that are outside of the selected portion;
a low noise amplifier that is configured to amplify the waveforms;
a waveform collector that is configured to collect the waveforms;
a downconverter that is configured to downconvert said collected waveforms in frequency;
an analog-to-digital converter that is configured to convert the downconverted waveforms to digital waveforms;
an image rejection first Low Pass (LP) filter, that is configured to suppress an image of said downconverted waveforms;
an up/down converter that is configured to up or down convert said first filtered waveforms, wherein a video carrier would be shifted closer to 0 Hertz frequency;
a second filter that is configured to filter said converted waveforms;
a downsampler that is configured to downsample said second filtered waveforms so as to reduce the sampling rate;
a serial-to-parallel converter that is configured to convert said downsampled waveforms from serial to parallel by dividing said downsampled waveforms into a plurality of time domain segments, each time domain segment including a plurality of time domain samples, each time domain sample being a vector having a real part and an imaginary part;
a buffer that is configured to store said time domain segments;
a Fast Fourier Transform module that is configured to apply a Fast Fourier Transform (FFT) to each of the stored time domain segments;
a high order statistical analysis analyzer that is configured to determine higher order moments and cumulants of real and imaginary portions of said samples;
a signal probability calculator that is configured to calculate signal probability; and
a classifier that is configured to classify said received waveforms as being Class noise or Class signal.

* * * * *